United States Patent
Morlen et al.

(10) Patent No.: US 9,276,927 B1
(45) Date of Patent: *Mar. 1, 2016

(54) SYSTEMS AND METHODS FOR OBSCURING ENTRY OF ELECTRONIC SECURITY TERM

(71) Applicant: United Services Automobile Association (USAA), San Antonio, TX (US)

(72) Inventors: Randy Ray Morlen, San Antonio, TX (US); Michael Frank Morris, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/484,514

(22) Filed: Sep. 12, 2014

Related U.S. Application Data (63) Continuation of application No. 12/142,970, filed on Jun. 20, 2008, now Pat. No. 8,856,899.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *G06F 21/31* | (2013.01) |
| *G06F 21/46* | (2013.01) |

(52) U.S. Cl.
CPC ............. *H04L 63/08* (2013.01); *G06F 21/31* (2013.01); *G06F 21/46* (2013.01); *H04L 63/0846* (2013.01)

(58) Field of Classification Search
CPC ... H04L 1/0008; H04L 9/088; H04N 7/26845

USPC .......................................................... 726/4, 7
See application file for complete search history.

(56) References Cited

U.S. PATENT DOCUMENTS

| | | | |
|---|---|---|---|
| 5,956,404 A | 9/1999 | Schneier et al. | |
| 6,578,760 B1 | 6/2003 | Otto | |
| 7,225,253 B2 | 5/2007 | Ofir et al. | |
| 7,698,571 B2 * | 4/2010 | Harada et al. | 713/193 |
| 7,853,992 B2 * | 12/2010 | Garg et al. | 726/4 |

(Continued)

OTHER PUBLICATIONS

Bank of America, "SafePass™: Online Banking Security Enhancements," Retrieved from the internet <http://www.bankofamerica.com/privacy/index.cfm?template=learn_about_safepass>. © 2008 Bank of America Corporation.

(Continued)

*Primary Examiner* — Arvin Eskandarnia
(74) *Attorney, Agent, or Firm* — Fish & Richardson P.C.

(57) ABSTRACT

A security service determines whether to grant a user access to a resource. The service receives from the user a security term in an obscured form derived from a revealed form of the security term according to a predefined padding scheme known to the user and to the security service. The service applies the padding scheme to the received term to result in a de-padded security term and confirms that the de-padded security term matches the retrieved revealed security term. Additionally, the service confirms that the received term has not been previously employed within a predetermined frame of reference. Accordingly, if the received obscured security term is purloined and re-used within the predetermined frame of reference, the security service denies access to the resource.

18 Claims, 4 Drawing Sheets

(56) References Cited

U.S. PATENT DOCUMENTS

| | | |
|---|---|---|
| 2003/0028484 A1 | 2/2003 | Boylan et al. |
| 2003/0084301 A1 | 5/2003 | Krawetz et al. |
| 2004/0177281 A1* | 9/2004 | Balaz et al. ............... 713/202 |
| 2006/0294392 A1* | 12/2006 | Veprek et al. ............. 713/183 |
| 2008/0095331 A1 | 4/2008 | Wlasiuk |
| 2008/0222707 A1 | 9/2008 | Pathuri et al. |
| 2009/0217035 A1* | 8/2009 | Abdul Hameed Khan ... 713/168 |

OTHER PUBLICATIONS

Manzoor, Umar et al., "Ensuring Data Security & Consistency in FTIMA—A Fault Tolerant Infrastructure for Mobile Agents", Proceedings of World Academy of Science, Engineering and Technology vol. 21 May 2007 ISSN 1307-6884. © 2007 WASET.org.

* cited by examiner

| | |
|---|---|
| REVEALED SECURITY TERM 10R: | WBPA |
| PADDING SCHEME 22:<br>(X IS ANY NONSENSE CHARACTER) | WXBXPXAX |
| OBSCURED SECURITY TERM 10X:<br>(NONSENSE CHARACTERS ADDED<br>BASED ON PADDING SCHEME 22) | W2BAPQA4 |
| DE-PADDED SECURITY TERM 10D:<br>(NONSENSE CHARACTERS REMOVED<br>BASED ON PADDING SCHEME 22) | W_B_P_A_ |
| DE-PADDED SECURITY TERM 10D:<br>(SPACES LEFT FROM NONSENSE<br>CHARACTERS DELETED) | WBPA |

SYSTEMS AND METHODS FOR OBSCURING ENTRY OF ELECTRONIC SECURITY TERM

CLAIM OF PRIORITY

This application is a continuation of and claims priority under 35 U.S.C. §120 to U.S. patent application Ser. No. 12/142,970, filed Jun. 20, 2008, the entire contents of which are hereby incorporated by reference.

FIELD

The present disclosure is directed to systems and methods that allow a user to obscure the entry of an electronic security term when gaining access to a restricted resource. More particularly, the present disclosure is directed to such systems and methods that define a padding scheme which the user is to employ to pad the security term with additional characters. Additionally, the present disclosure is directed to systems and methods for detecting improper use of a padded security term and for responding thereto.

BACKGROUND

In many electronic contexts, access to a restricted resource is provided to a user only upon the user entering an electronic security term. For one example, when a user wishes to gain access to a particular site on a network such as the Internet, the user oftentimes must have a security term such as a password along with a user ID or the like, and the user ID and password must be appropriately entered and validated prior to the user being given access to the particular site. For another example, when a user wishes to gain access to services available from a bank ATM (Automated Teller Machine) or the like, the user oftentimes must have a security term such as a PIN (Personal Identification Number) along with an electronic ATM card or the like, the ATM card must be electronically presented at the ATM, the PIN must be appropriately entered into the ATM, and the presented ATM card and entered PIN must then be validated prior to the user being given access to the services available from the ATM. For yet another example, when a user wishes to gain access to a security area within a building, a room, a perimeter, or the like, the user oftentimes must have a security term such as an access code along with an electronic access card or the like, the access card must be electronically presented at an access device, the access code must be appropriately entered into the access device, and the presented access card and entered accessed code must then be validated prior to the user being given access to the security area.

Note, though, that a nefarious entity may attempt by a variety of means to obtain the security term of a user in order to inappropriately gain access to a corresponding restricted resource. In the example above where the resource is a particular site on a network such as the Internet, then, the nefarious entity would attempt to obtain the password of the user along with the user ID. Similarly, in the example above where the resource is services available from a bank ATM, the nefarious entity would attempt to obtain the PIN for use with the ATM card or a copy thereof. As should now be evident, in the example above where the resource is a security area, the nefarious entity would attempt to obtain the access code for use with the access card or a copy thereof.

In any particular situation, the nefarious entity may attempt to obtain the security term of a user by any of a number of methods, including subterfuge, electronic probing, verbal or physical threats, outright theft, or the like. Notably, one of the simplest methods that the nefarious entity may employ is to view the user entering the security term. Thus, the nefarious entity may stand behind the user while the user is at a computing device entering a password, at an ATM entering a PIN, at an access device entering an access code, or the like, and while so standing view the user entering the security term, presuming the user is not especially careful to guard such entered security term from such viewing. In a similar manner, the nefarious entity may be some distance away from the entering user but viewing same by way of a magnification device.

Regardless of how the nefarious entity obtains the security term of the user, such nefarious entity may then employ such security term to access the corresponding restricted resource, likely in a manner that is detrimental to the user and/or the organization providing the restricted resource. In particular, if the restricted resource is a particular site on a network such as the Internet, the nefarious entity could conduct a transaction at the site and charge same to the user; if an ATM, the nefarious entity could withdraw funds of the user therefrom; and if a security area, the nefarious entity could enter and take an object therein or create mayhem therein.

Accordingly, a need exists for a system and method for obscuring entry by a user of an electronic security term at an entry device therefor. In particular, a need exists for such a system and method that requires the user to enter characters in addition to the characters of the security term so as to pad the security term according to a predefined padding scheme. More particularly, a need exists for such a system and method whereby the security term is discerned from the entered padded security term, and for denying access to a restricted resource if the entered padded security term has recently been employed.

SUMMARY

The aforementioned needs are satisfied at least in part by a system and method having a security service for determining whether to grant a user access to a resource. The security service receives from the user a security term associated with the user, where the received security term is in an obscured form derived from a revealed form of the security term according to a predefined padding scheme known to the user and to the security service. The security service retrieves the revealed security term for the user and the padding scheme from a record for the user, and applies the retrieved padding scheme to the received obscured security term to result in a de-padded security term.

The security service then compares the de-padded security term to the retrieved revealed security term to confirm that the de-padded security term matches the retrieved revealed security term. Additionally, the security service confirms that the received obscured security term has not been previously employed within a predetermined frame of reference. Accordingly, if the received obscured security term is purloined and re-used within the predetermined frame of reference, the security service denies access to the resource.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
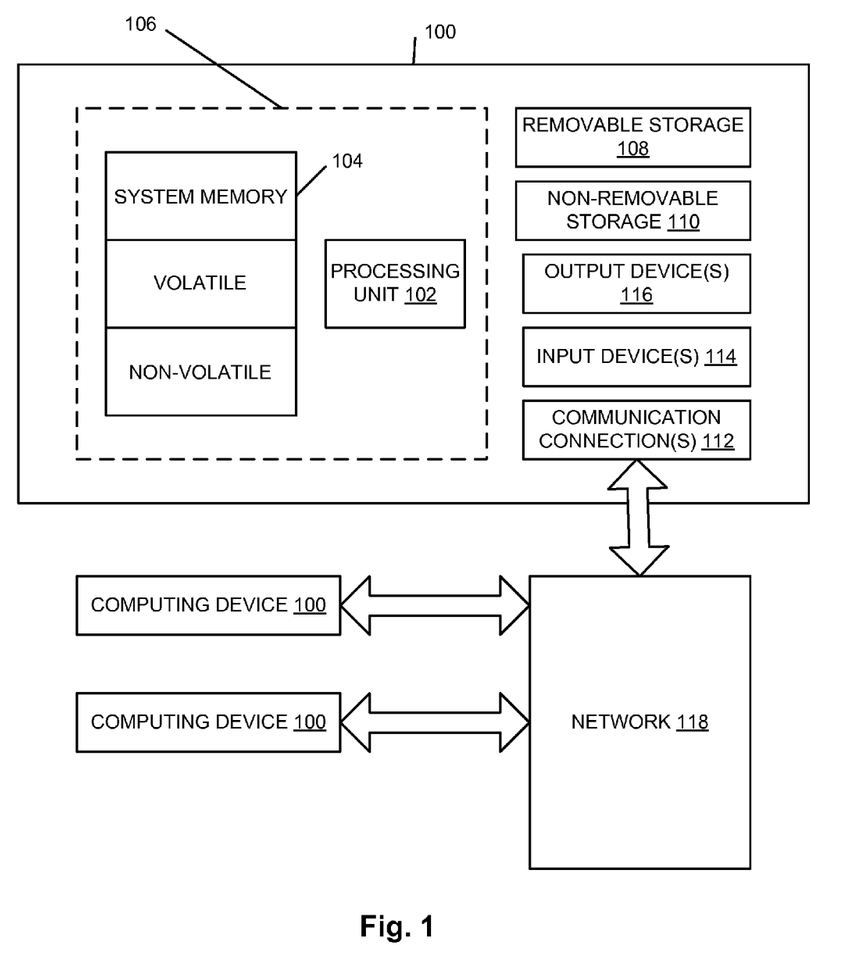
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Gaining Access Via Electronic Security Term

Figure 2:
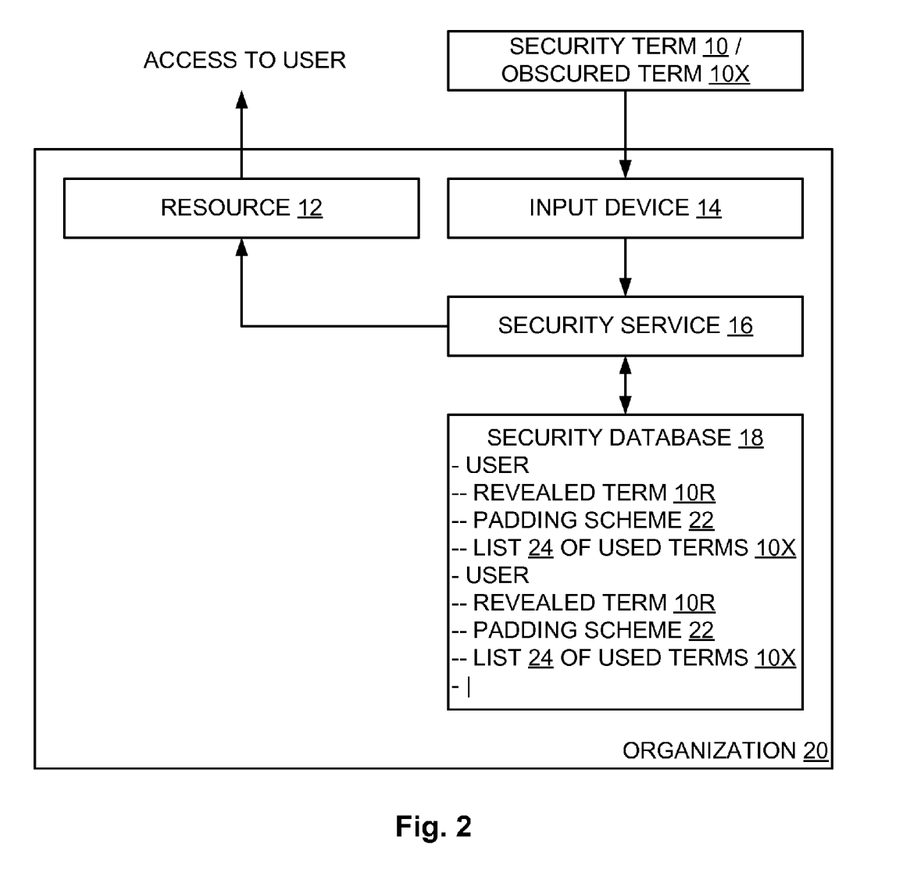
FIG. 2 is a block diagram of a system with a security service that grants access to a resource to a user based on the user providing a security term in accordance with various embodiments of the present innovation.

Turning now to FIG. 2, it is to be understood that in any embodiment of the present innovation a requestor such as a user employs an electronic security term 10 to gain access to a restricted resource 12. As was alluded to above, the restricted resource 12 may among other things be access to a particular site on a network such as the Internet, in which the security term 10 may be a password or the like; a bank ATM (Automated Teller Machine) or the like, in which case the security term 10 may be a PIN (Personal Identification Number) or the like; a security area within a building, a room, a perimeter, or the like, in which case the security term 10 may be an access code; etc. As should be appreciated, though, the resource 12 may be any other appropriate resource, in which case the security term 10 would be an appropriate corresponding term.

As shown, the security term 10 is entered into an appropriate electronic input device 14 which may be any appropriate input device. For example, in the case of the aforementioned network site, the input device 14 may be a computing device with an appropriate interface instantiated thereon. Likewise, in the case of the aforementioned ATM, the input device 14 may be a key panel on the ATM along with an interface displayed on a screen at the ATM, and in the case of the aforementioned security area, the input device 14 may be an access panel or the like with a number of entry keys and a screen or the like.

In any case, the user enters the security term 10 at the input device 14 to gain access to the resource 12, perhaps along with other indicia. As may be appreciated, such other indicia may be a presented user name or the like that is also entered into the input device 14, a card, fob, ID tag, or other personal item that is electronically presented to the input device 14, etc. As shown in FIG. 2, such entered security term 10 and any other entered indicia are transmitted from the input device 14 to a security service 16 which determines whether access to the resource 12 may be granted to the user based on such entered security term 10 and any other entered indicia, perhaps based on appropriate data stored in a security database 18 or the like. Such security service 16 and database 18 are known or should be apparent to the relevant public and therefore need not be set forth in any detail other than that which is provided. Accordingly, such security service 16 and database 18 may be any appropriate service and database without departing from the spirit and scope of the present innovation.

Particularly with regard to the security term 10, the user must take care to prevent a nefarious entity from viewing or otherwise gaining access to such security term 10, particularly as the security term 10 is being entered at the input device 14, although also from other sources. Otherwise, and as was alluded to above, the nefarious entity may be able to view and thereby purloin the security term 10, and perhaps employ same to inappropriately gain access to the resource 12 as protected by way of such security term 10. As should be understood, such access by such nefarious entity would in all likelihood be detrimental to the user and/or the organization 20 that provides the resource 12. In particular, if the restricted resource 12 is a particular site on a network such as the Internet, the nefarious entity could conduct a transaction at the site and charge same to the user; if an ATM, the nefarious entity could withdraw funds of the user therefrom; and if a security area, the nefarious entity could enter and take an object therein or create mayhem therein.

Obscuring Entry of Security Term 10

Accordingly, in various embodiments of the present innovation, the user enters the security term 10 in an obscured form at the input device 14 to gain access to the resource 12. Thus, even if viewed and thereby purloined by a nefarious entity, such nefarious entity would not obtain the security term 10 of the user but instead would obtain the security term 10 in the obscured form.

Moreover, in various embodiments of the present innovation, the user must enter the security term 10 in a different obscured form each time such security term 10 is presented, at least within a predetermined period of time or within a predetermined number of times. Otherwise, if the security term 10 is entered in the same obscured form twice, particularly within the predetermined period of time or within the predetermined number of times, access to the resource 12 is denied. As a result, if the nefarious entity attempts to use a purloined security term 10 in a previously entered obscured form, particularly within the predetermined period of time or within the predetermined number of times, such attempt fails and access to the resource 12 is denied to such nefarious entity.

Figure 3:
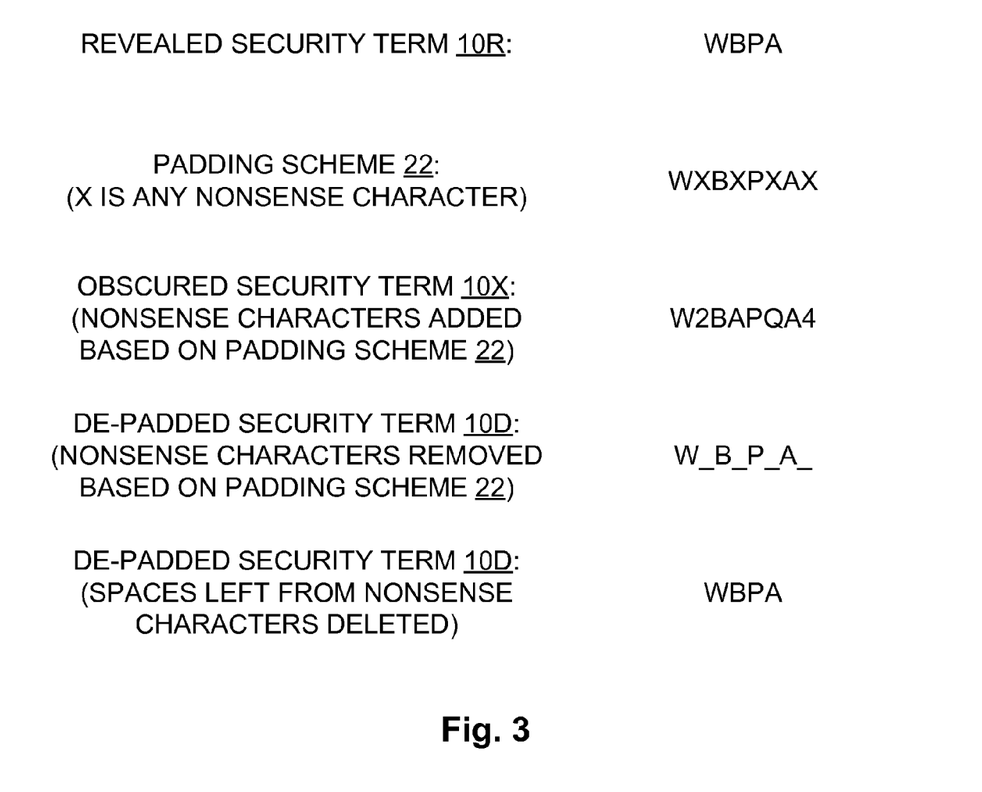
FIG. 3 is a block diagram of various forms of the security term of FIG. 2 in accordance with various embodiments of the present innovation.

In various embodiments of the present innovation, and turning now to FIG. 3, the user enters the security term 10 of FIG. 2 in an obscured form $10x$ defined according to a predefined padding scheme 22 (FIG. 2), where such predefined padding scheme 22 is known to the user and to the security service 16. In such a padding scheme 22, the security term 10 of FIG. 2 in a non-obscured or revealed form $10r$ comprises a set number of predefined characters in a predefined order, and additional characters are added among the predefined characters of the revealed security term $10r$ in a predefined manner to form the obscured security term $10x$.

Such padding scheme 22 may be most any appropriate padding scheme without departing from the spirit and scope of the present innovation, presuming that the padding scheme 22 may be employed by the user to enter the obscured security term $10x$, may also be employed by the security service 16 to convert the obscured security term $10x$ to the revealed security term $10r$, and is made known to the user and the security service 16 beforehand. As may be appreciated, the security service 16 may store the predefined padding scheme 22 employed by the user in the security database 18, perhaps in a record or the like maintained by the security service 16 for the user which also contains the revealed security term 10r.

In connection with such a predefined padding scheme 22, it may be that the revealed security term 10r has a predefined number of predefined characters in a predefined order, where the characters may be letters, numbers, or other available similar characters that can be entered by the corresponding a user at an appropriate input device 14. If in the example the predefined number of characters is four, then, let it be assumed that the revealed security term 10r is WBPA.

In a predefined padding scheme 22, then, it may be that WBPA in the obscured form is padded with four additional characters, each represented as x, where the additional characters alternate with the characters of WBPA, i.e. WxBxPxAx or xWxBxPxA. In another possible predefined padding scheme 22, it may be that WBPA in the obscured form is padded with six additional characters, each represented as x, where two of the additional characters are provided, then WB, then another two of the additional characters are provided, then PA, and then another two of the additional characters are provided, i.e. xxWBxxPAxx.

As should be appreciated, in any particular padding scheme 22, each additional character x is in fact a nonsense character that is not required to have any particular value and therefore can be any particular value. In point of fact, and as will be appreciated, the security service 16 ignores the value of each additional character x when converting an obscured security term 10x to a revealed security term 10r, and in particular discards each such additional character x regardless of the particular value thereof during such conversion.

As may be appreciated, the padding scheme 22 employed may be most any padding scheme that combines the characters of the revealed security term 10r with a number of additional characters x in predefined positions to form the obscured security term 10x. Note, though, that some padding schemes 22 may be less favorable. For example, too many additional characters x in a padding scheme 22 may present difficulties to the user, while too few additional characters x may cause a padding scheme 22 to be relatively insecure. Similarly, a padding scheme 22 with too many consecutive additional characters x (WBPAxxxxxxxx, e.g.) may also be relatively insecure, and accordingly the additional characters x should be more dispersed (WxBxxPxAx, e.g.) to increase security.

Method Employing Padding Scheme 22

Figure 4:
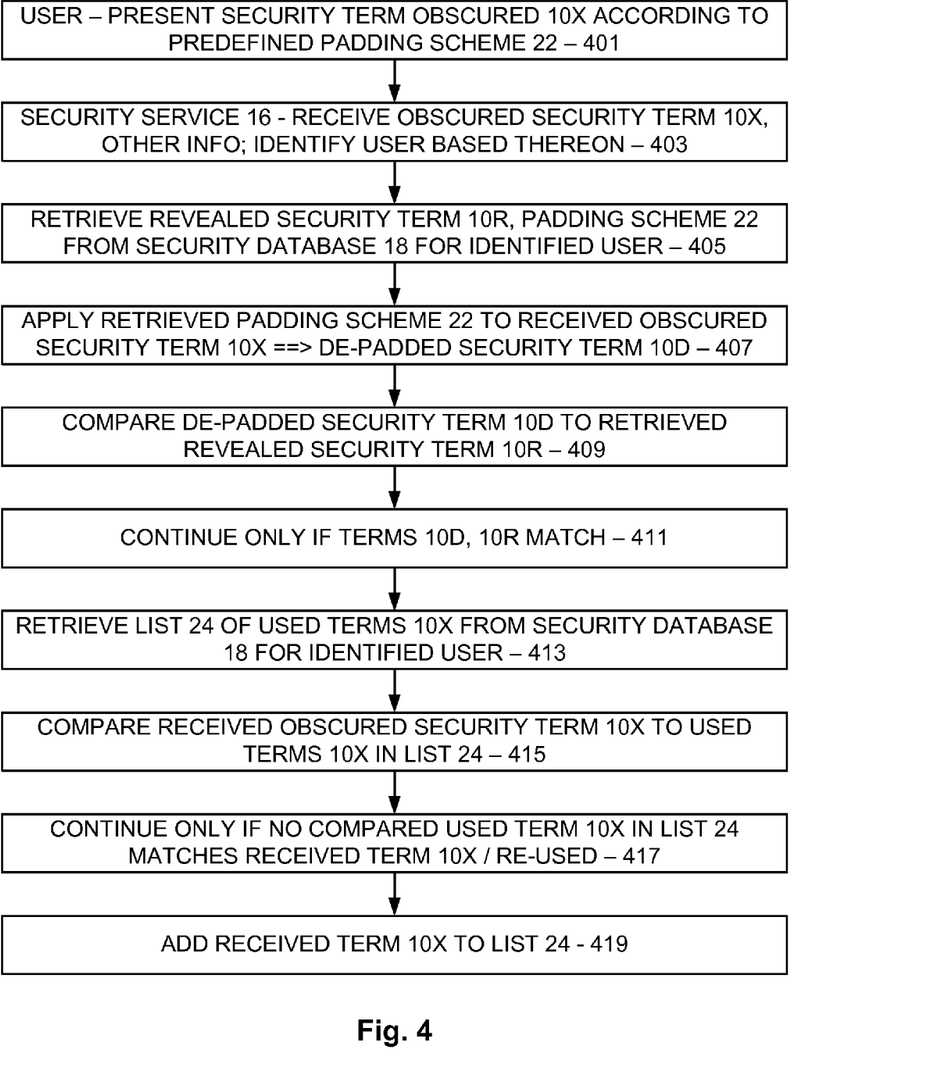
FIG. 4 is a flow diagram showing actions performed in connection with the system of FIG. 2 and various forms of the security term of FIG. 3 in accordance with various embodiments of the present innovation.

Turning now to FIG. 4, and in various embodiments of the present innovation, a user with a security term 10 and a predefined padding scheme employs same to access a corresponding restricted resource 12 in the following manner. Preliminarily, the user presents himself or herself at an appropriate input device 14 and enters therein the security term obscured 10x according to the predefined padding scheme 22 for such user (401). As may be appreciated, such entry is performed in conjunction with an implicit or explicit request for access to the resource 12, and may include additional information, such as for example a user name, a presented card, ID, tag, or the like. The input device 14 collects such obscured security term 10x and any other additional information and transmits same to the security service 16, which is typically remote from the input device 14. Accordingly, such transmission may be in an encrypted format if necessary or desirable and if so decrypted by or for the security service 16.

In any case, the security service 16 receives the obscured security term 10x and any other additional information and based thereon identifies the user (403). Such identification may be performed in any appropriate manner, such as for example by the additional information. Based on the identified user, then, the security service 16 retrieves the corresponding revealed security term 10r and padding scheme 22 from the security database 18 (405), applies the retrieved padding scheme 22 to the received obscured security term 10x to result in a de-padded security term 10d (FIG. 3) (407), and compares the de-padded security term 10d to the retrieved revealed security term 10r (409). As may be appreciated, if the terms 10d, 10r match, the security service 16 continues (411). However, if the terms 10d, 10r do not match, the security service 16 denies access to the resource 12 based on the obscured security term 10x being incorrect.

As may be appreciated, applying such retrieved padding scheme 22 to result in the de-padded security term 10d as at 407 and comparing as at 409 should be apparent based on the present disclosure and therefore need not be set forth herein in any detail other than that is provided. For example, and with regard to the retrieved revealed security term 10r of WBPA, if the retrieved padding scheme 22 is WxBxPxAx and the obscured security term 10x is WDBSPFAA, the security service 22 would ignore the second, fourth, sixth, and eight characters to result in a de-padded security term 10d of WBPA, which of course matches the retrieved revealed security term 10r. Accordingly, the security service would continue as at 411.

Likewise, and with regard to the same retrieved revealed security term 10r of WBPA and the same retrieved padding scheme 22 of WxBxPxAx, if the obscured security term 10x is WZBZPZFAA, the security service 22 would also ignore the second, fourth, sixth, and eight characters to result in the same de-padded security term 10d of WBPA, which of course again matches the retrieved revealed security term 10r. Thus, the security service would again continue as at 411. However, and with regard to the same retrieved revealed security term 10r of WBPA and the same retrieved padding scheme 22 of WxBxPxAx, if the obscured security term 10x is ZBZPZ-FAAW, the security service 22 would still ignore the second, fourth, sixth, and eight characters, but here such action would result in a de-padded security term 10d of ZZZA, which of course does not match the retrieved revealed security term 10r. Thus, the security service would here not continue as at 411 but instead would deny access to the resource 12.

Using Same Obscured Security Term 10x Multiple Times

As was alluded to above, a padding scheme 22 used according to a method such as has thus far been set forth in connection with FIG. 4 is of little use if a nefarious entity purloins a previously used obscured security term 10x and re-uses same. In particular, and as should be appreciated from actions 407-411, such a re-used purloined term 10x would still result in a match at 411, presuming of course the purloined term 10x was properly constructed initially. Accordingly, and in various embodiments of the present innovation, a different obscured security term 10x must be presented as at 401 each time access to the resource 12 is attempted, at least within a predetermined period of time (such as one day, one week, etc.) or within a predetermined number of times (such as 5 times, 10 times, 20 times, etc.). If such a different obscured term 10x is not presented, but instead a re-used term 10x is presented, access to the resource 12 is denied. As a result, an attempt by a nefarious entity to re-use a purloined term 10x, at least within the predetermined period of time or number of times, is thwarted.

Note that to detect a re-used term 10x, the security service 16 must maintain a list 24 or the like of used terms 10x in connection with each user, perhaps in the security database 18 in conjunction with the record for the user. In particular, the security service 16 would both check a received term 10x against the list 24 of used terms 10x, and would also add the received term 10x to such list 24, perhaps along with a time of receipt. Moreover, based on the aforementioned time and/or count parameters which are employed to detect a re-used term 10x, the security service 16 may also update the list 24 as necessary to remove received terms 10x that are outside such parameters.

In particular, and still referring to FIG. 4, the security service 16 would at some point retrieve the list 24 of used terms 10x from the security database 18 (413), and after determining a match and continuing as at 411 would compare the received obscured security term 10x to the used terms 10x in the list 24 that are within any set time or count parameters (415). As may be appreciated, if any compared used term 10x in the list 24 matches the received term 10x, the security service 16 denies access to the resource 12 based on the received term 10x being re-used (417), at least potentially by a nefarious entity with a purloined term 10x. Otherwise, if no compared used term 10x in the list 24 matches the received term 10x, the security service 16 adds the received term 10x to the list 24 (419) and continues, either to allow such access or apply further tests.

Note that in addition to a nefarious entity presenting a purloined and re-used security term 10x as at 401, a user may innocently and mistakenly present a security term 10x that has already been used and is in the list 24. In such a case, and as should be appreciated, the security service 16 still denies access as at 417. However, the security service 16 should give the innocent and mistaken user one or more additional opportunities to present a non-used security term 10x. That said, the security service 16 likely should not provide too many additional opportunities, especially inasmuch as a nefarious entity may employ such additional opportunities to glean the padding scheme 22.

In various embodiments of the present innovation, use of an obscured security term 10x that causes access to be denied at about 411 or 417 may result in the rightful user of the corresponding revealed security term 10r being sent a message regarding such denial, perhaps by way of a telephone, electronic mail, a text message, etc. Thus, the security service 16 may have access to information by which such a message may be sent, or may employ a related service with such information to send such a message.

In either case, the user upon receiving the message may determine that the denial was based on actions the user performed or that the denial was based on actions that another person performed, perhaps without the explicit or implicit permission of the user, i.e., a nefarious entity. In the latter case, the user may then take appropriate steps to thwart further attempts by such another person/nefarious entity, including notifying the organization 20 such that the organization 20 can change the revealed security term 10r, among other things. Note that based on such a messaging capability, the security service 16 may also send another revealed security term 10r to the user, and/or may allow the user to give permission for access despite the denial at about 411 or 417.

CONCLUSION

Thus far, the various embodiments of the present innovation have been set forth primarily in terms of an organization 20 providing access to a resource 12 such as an ATM, a security areas, or an electronic network site by way of a corresponding input device 14. However, and as should be appreciated, the organization 20 may instead be providing access to any other resource 12 by way of a corresponding input device 14. For example, the resource 12 may be funds in a bank account or the like accessed by a point of sale input device 14 at a retail store or the like.

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a system and method are provided to obscure entry by a user of an electronic security term 10 at an input device 14 therefor. The user enter characters in addition to the characters of the security term 10 so as to pad the (revealed) security term 10r according to a predefined padding scheme 22. The (de-padded) security term 10d is discerned from the padded (obscured) security term 10x, and access to a corresponding restricted resource 12 is denied if the padded (obscured) security term 10x has recently been employed.

It should be appreciated that changes could be made to the embodiments described above without departing from the innovative concepts thereof. For example although the security database 18 is disclosed as maintaining the revealed security term 10r, the padding scheme 22, and the list 24 for each user, at least some of such items may be stored elsewhere without departing from the spirit and scope of the present innovation. It should be understood, therefore, that this innovation is not limited to the particular embodiments disclosed, but it is intended to cover modifications within the spirit and scope of the present innovation as defined by the appended claims.

The invention claimed is:

1. A non-transitory computer-readable storage medium having computer-executable instructions thereon implementing a method performed by a security service for determining whether to grant a user access to a resource, the method comprising:
   receiving from the user a security term associated with the user, the received security term being in an obscured form derived from a revealed form of the security term according to a predefined padding scheme known to the user and to the security service;
   retrieving the revealed security term for the user and the padding scheme from a record for the user;
   retrieving a list of obscured security terms; that were previously employed within a predetermined time frame;
   applying the retrieved padding scheme to the received obscured security term to result in a de-padded security term;
   comparing the de-padded security term to the retrieved revealed security term to confirm that the de-padded security term matches the retrieved revealed security term; and
   checking whether the received obscured security term is included on the list of previously used security terms, whereby if the received obscured security term is included on the list of previously used security terms, the security service denies access to the resource.

2. The medium of claim 1 wherein the resource is one of funds in a financial account, a security area, and a site on a computer network.

3. The medium of claim 1 wherein according to the padding scheme the security term in the revealed form comprises a set number of predefined characters in a predefined order, and nonsense characters are added among the predefined characters of the revealed security term in a predefined manner to form the obscured security term.

4. The medium of claim 1 wherein the record for the user is retrieved from a security database having a plurality of records therein, each record having an identification of a user, the revealed security term of the user, and the padding scheme employed by the user.

5. The medium of claim 1 wherein the received security term from the user is accompanied by an identification of the user as provided thereby, the identification being employed by the security service to locate the record for the user.

6. The medium of claim 1 wherein the predetermined frame of reference within which the received obscured security term has not been previously employed is one of a predetermined period of time and a predetermined number of times.

7. A computer-implemented method comprising:
   receiving from the user a security term associated with the user, the received security term being in an obscured form derived from a revealed form of the security term according to a predefined padding scheme known to the user and to the security service;
   retrieving the revealed security term for the user and the padding scheme from a record for the user;
   retrieving a list of obscured security terms; that were previously employed within a predetermined time frame;
   applying the retrieved padding scheme to the received obscured security term to result in a de-padded security term;
   comparing the de-padded security term to the retrieved revealed security term to confirm that the de-padded security term matches the retrieved revealed security term; and
   checking whether the received obscured security term is included on the list of previously used security terms, whereby if the received obscured security term is included on the list of previously used security terms, the security service denies access to the resource.

8. The computer-implemented method of claim 7 wherein the resource is one of funds in a financial account, a security area, and a site on a computer network.

9. The computer-implemented method of claim 7 wherein according to the padding scheme the security term in the revealed form comprises a set number of predefined characters in a predefined order, and nonsense characters are added among the predefined characters of the revealed security term in a predefined manner to form the obscured security term.

10. The computer-implemented method of claim 7 wherein the record for the user is retrieved from a security database having a plurality of records therein, each record having an identification of a user, the revealed security term of the user, and the padding scheme employed by the user.

11. The computer-implemented method of claim 7 wherein the received security term from the user is accompanied by an identification of the user as provided thereby, the identification being employed by the security service to locate the record for the user.

12. The computer-implemented method of claim 7 wherein the predetermined frame of reference within which the received obscured security term has not been previously employed is one of a predetermined period of time and a predetermined number of times.

13. A system comprising:
   one or more computers and one or more storage devices storing instructions that are operable, when executed by the one or more computers, to cause the one or more computers to perform operations comprising:
      receiving from the user a security term associated with the user, the received security term being in an obscured form derived from a revealed form of the security term according to a predefined padding scheme known to the user and to the security service;
      retrieving the revealed security term for the user and the padding scheme from a record for the user;
      retrieving a list of obscured security terms; that were previously employed within a predetermined time frame;
      applying the retrieved padding scheme to the received obscured security term to result in a de-padded security term;
      comparing the de-padded security term to the retrieved revealed security term to confirm that the de-padded security term matches the retrieved revealed security term; and
      checking whether the received obscured security term is included on the list of previously used security terms, whereby if the received obscured security term is included on the list of previously used security terms, the security service denies access to the resource.

14. The system of claim 13 wherein the resource is one of funds in a financial account, a security area, and a site on a computer network.

15. The system of claim 13 wherein according to the padding scheme the security term in the revealed form comprises a set number of predefined characters in a predefined order, and nonsense characters are added among the predefined characters of the revealed security term in a predefined manner to form the obscured security term.

16. The system of claim 13 wherein the record for the user is retrieved from a security database having a plurality of records therein, each record having an identification of a user, the revealed security term of the user, and the padding scheme employed by the user.

17. The system of claim 13 wherein the received security term from the user is accompanied by an identification of the user as provided thereby, the identification being employed by the security service to locate the record for the user.

18. The system of claim 13 wherein the predetermined frame of reference within which the received obscured security term has not been previously employed is one of a predetermined period of time and a predetermined number of times.

* * * * *